United States Patent [19]
Graff et al.

[11] Patent Number: 4,465,940
[45] Date of Patent: Aug. 14, 1984

[54] ELECTRO-OPTICAL TARGET DETECTION

[75] Inventors: Herman Graff, Beverly Hills, Calif.; James D. Joseph, Oakdale, Minn.

[73] Assignee: The United States of America as represented by the Secretary of the Air Force, Washington, D.C.

[21] Appl. No.: 368,787

[22] Filed: Apr. 15, 1982

[51] Int. Cl.³ .................... H01J 40/14; G01J 1/00; F41G 7/00
[52] U.S. Cl. .................... 250/578; 250/339; 244/3.16
[58] Field of Search ............ 244/3.16; 250/578, 226, 250/342, 339, 204

[56] References Cited

U.S. PATENT DOCUMENTS 3,946,382 3/1976 Kossiakoff et al. ............ 343/5
4,001,820 1/1977 Rosenbaum et al. ............ 343/5
4,314,151 2/1982 Suzuki et al. ............ 250/204

Primary Examiner—David C. Nelms
Assistant Examiner—Ernest Austin
Attorney, Agent, or Firm—Donald J. Singer; Bernard E. Franz

[57] ABSTRACT

An apparatus directed to a signal processing circuit for combining data from several spectral bands to enhance the signal-to-background ratio of a target detection system. Two spectral bands, with separate sensing arrays, receive analog signals which are fed to separate multiplexer units. From the multiplexers, the analog signals are applied to a comparator where they are compared with each other and also separately applied to shift registers where the signals are retained for further processing. If, during comparison, the ratio of the two bands is less than a threshold, there is an absence of cloud return and the signals stored in both shift registers are combined in a final output register. If the ratio of the two bands is more than a threshold, the band having the most cloud return is not used and the shift register containing the greater percentage of target return is processed through the output register.

4 Claims, 1 Drawing Figure

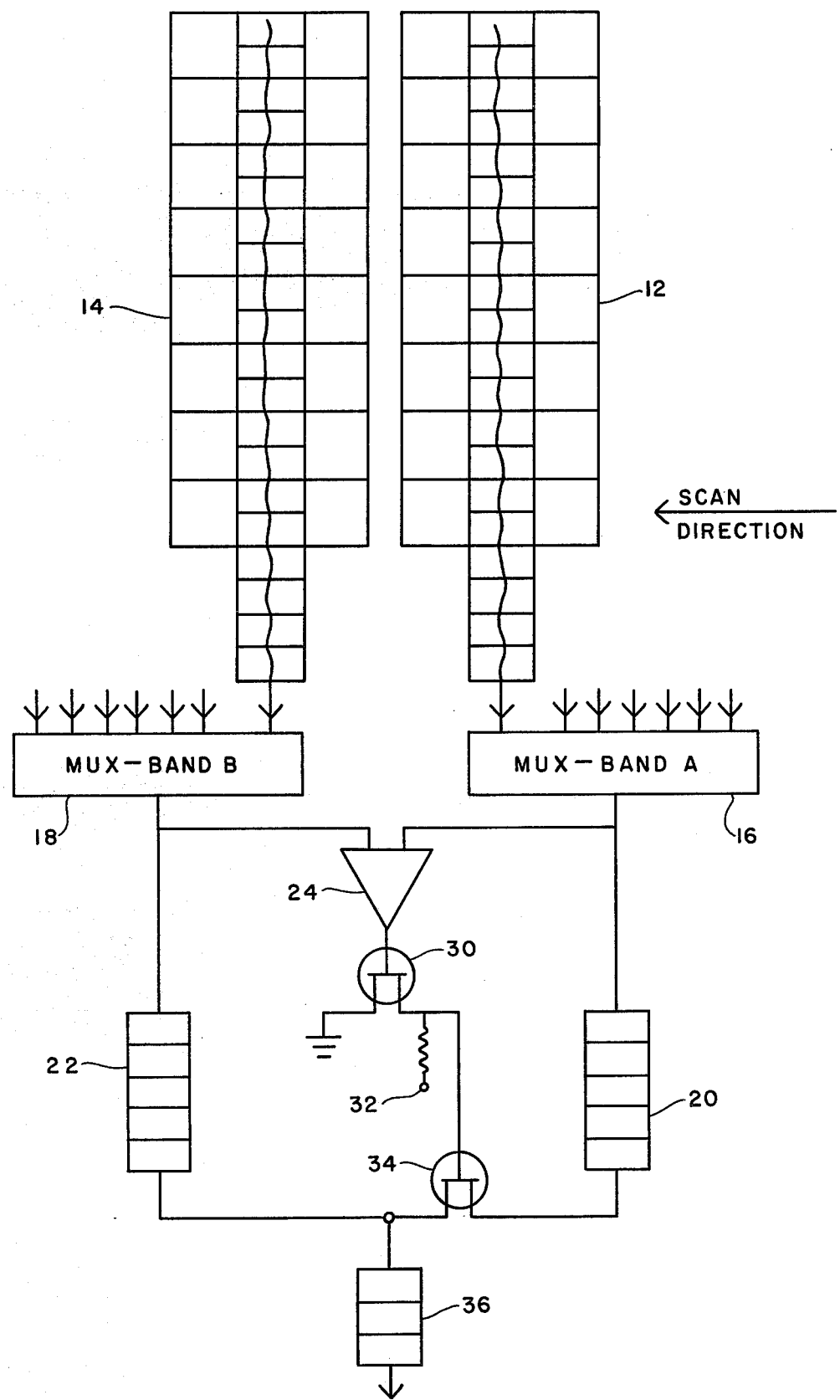

ELECTRO-OPTICAL TARGET DETECTION

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of electro-optics and, more particularly, to electro-optics involved in target detection techniques.

In developing systems to optically detect targets, problems are encountered when the target appears amid a background of clouds. In such situations, tradeoffs must be made in order to obtain a sufficient signal-to-background ratio that will allow detection. The signal-to-background ratio corresponds to a signal-to-noise ratio in electrical devices. The bandwidth in which the system operates should also be examined to maximize performance. Three elements must be considered in bandwidth optimization. These are (1) spectral characteristics of the target, (2) spectral characteristics of the cloud background, and (3) atmospheric transmission and spectral characteristics of the background in the absence of clouds. The current infrared frequency band was chosen primarily to provide adequate signal strength while minimizing the background cloud return. The present art consists of a group of sensors capable of a certain degree of signal-to-background detection within a specified bandwidth feeding their information into an electronic network for signal processing.

One apparatus for the resolution of targets in the presence of clutter is described in U.S. Pat. No. 3,946,382. Another apparatus for identifying a target by recognizing its radar signature and separating this signature from background clutter is taught in U.S. Pat. No. 4,001,820. Both of these apparatus are specifically directed to radar signals and both involve a comparison with a threshold. The present invention on the other hand relates to video signals in general and involves more than one spectral bandwidth.

SUMMARY OF THE INVENTION

It is therefore an object of the invention to provide a new and improved signal processing scheme which significantly enhances the signal-to-background ratio of a new sensor system for target detection purposes.

According to the invention, two spectral sub-bands are used with separate sensing arrays to receive analog signals from each sub-band. The signals are coupled through shift registers and multiplexers to a comparator where they are compared with each other. If the ratio of the sub-bands is less than a predetermined threshold, there is an absence of cloud return with the target return and if the ratio is greater than the threshold, there is cloud return with the target return. When there is an absence of cloud return, the signals from both sub-bands are combined to produce the output signal. When a cloud return is present, only the signal from the sub-band having the greater percentage of target return is processed.

A feature of the invention is the provision of two spectral sub-bands with separate sensing arrays combined with digital logic for comparing and selecting the optimum signal based upon the amount of cloud return.

DESCRIPTION OF THE DRAWING

The single FIGURE is a schematic drawing of one embodiment of the target detection circuit according to the invention.

DETAILED DESCRIPTION OF THE INVENTION

The invention has many applications. One specific application which demonstrates the principles of the invention is the automatic separation of snow returns from cloud returns as viewed by a sensor on a satellite. In this case, snow is the "target of interest" and is highly reflective in the visible wavelength and poorly reflective in the near infrared. In contrast, clouds are reflective in both the visible and the near infrared.

A recent study has demonstrated that the ratio of the reflectance of the near infrared wavelength to the reflectance in the visible wavelength for moderately transmissive atomspheres will have a large range depending on whether there are no clouds, waterclouds or snow in the field of view. As the atmosphere becomes less transmissive the ratio range decreases but a distinct separation can be made between the various returns once one determines the transmittance of the atmosphere. In moderately transmissive atmospheres the ratio of near infrared reflectance to visible reflectance is very low if there is snow in the field of view, relatively high is there are water clouds in the field-of-view, and intermediate if there are ice clouds in the field-of-view. This study demonstrated the major phenomenological principle of this invention, i.e., multi-spectral information when properly processed can be used to separate targets of interest from "clutter" returns. In this case cloud returns are considered "clutter" and snow is considered the target.

The above illustration is complicated by the fact that the target of interest, snow, is on the ground. Thus the opacity of the atmosphere must be measured by observing the absolute reflectivity of ground returns taking into account a knowledge of the type of ground being viewed and the known solar reflectance angle.

In a case where the target of interest is sufficiently above the ground so that the atmosphere above the target is essentially always high to moderately transmissive one can avoid the complication of calculating the opacity and use the simple comparator circuits of this invention.

Consider the application of separating ice clouds from water clouds in which the ice cloud is the target of interest. Assume the ice clouds are being observed at a high solar elevation angle so as to record ice cloud returns as close as possible to the threshold noise level of the sensor. Under these circumstances one would like to gather all the reflected photons possible and sum the reflected photons in the visible wavelength band and the near infrared band if there were no water clouds in the field-of-view.

If there were water clouds in the field of view one would still like to measure the ice cloud above the water cloud but would realize that the measurement in the visible wavelength would be totally misleading so one would comprise and measure the reflectance in the near infrared only as the best measurement under the circumstances.

The advantage of this approach is that it permits viewing of dim returns from ice clouds when there are no complicating water clouds in the field-of-view and preserves partial information when water clouds are present.

Also note that the ratio of near infrared to visible reflectivity is lower for ice clouds than water clouds. Thus by applying a threshold level to the ratio one can conclude that returns above the threshold are probably water clouds and the best chance to obtain ice cloud information is to examine the near infrared band level. If the ratio threshold is not achieved the cloud is probably an ice cloud and one would be interested in the photons reflected both in the visible and the infrared.

Turning to the application of detecting man made objects in the atmosphere above the clouds it is clear that the above principles of cloud detection could be used to determine whether or not a cloud was in the field-of-view. In the absence of clouds a broad spectral band could be selected to collect the bulk of the target emitted/reflected photons. This broad spectral band is achieved by summing two spectral bands. In the presence of clouds the spectral band could be narrowed to that portion of the spectral band where target energy is relatively greater than the cloud reflected. energy. This narrowed band consists of one of the two spectral bands.

In the FIGURE, two groups of detectors 12 and 14 respond to signals in two bands and route their analog signal into a processing signal. One group of detectors 12 corresponds to sub-band A while another group of detectors 14 corresponds to sub-band B. Each group of detectors consists of a string of cells connected to a common bus. Each cell contains more than one photo-conductive or photovoltaic detector typically a lead sulfide or mercury-cadmium telluride detector, whose current varies with the amount of ambient light. In a typical operation environment, a mirror (not shown) faces a target or scene and reflects this view onto the groups of detectors. The mirror may be mounted in such a fashion that it rotates, thereby causing the target or scene to be scanned. This situation is assumed to exist in the FIGURE. The target would first be seen by the detectors of group 12 and second by the detectors of group 14. The analog signals from each group of detectors are fed into two multiplexer units, 16 and 18, corresponding to sub-bands A and B, respectively. Delaying and adding, if desired, could be performed on the analog signals before entry into the multiplexer units. After multiplexing, a signal series output stream will be available for each of the two spectral sub-bands. Each serial output data stream is transported into separate CCD (Charge Coupled Device) analog shift registers, 20 and 22. Comparison of the outputs of sub-bands A and B reveals that the ratio of the two is larger for a cloud return than for a target return. If the ratio of sub-bands A:B is greater than a predetermined threshold level, the presence of a cloud return is indicated. Threshold level can be determined by a comparator 24 connected between the output analog signals from the multiplexer units. If the ratio of sub-bands A:B is greater than threshold, cloud return is present in sub-band A and only the data from sub-band B will be transmitted for further processing. On the other hand, if the ratio of sub-bands A:B is less than threshold, there is an absence of cloud return and the data from both spectral bands will be transmitted for further processing.

In operation, the output signal from the comparator 24 is fed into a transistor 30, typically a MOSFET type, at the gate electrode. This transistor has its source electrode connected to ground and its drain electrode coupled to a voltage source 32. The drain electrode also has its output connected to the gate of a second transistor 34, also typically a MOSFET type. The source electrode of this second transistor is connected to the output of shift register 20, while the drain electrode output is fed into a summing shift register 36. The output signal from shift register 22 is also fed into summing shift register 36. If the comparison of the two sub-bands is less than threshold, the comparator's output signal is low and will not turn on transistor 30. Thus, the output of this transistor will be the supply voltage which will turn on transistor 34, allowing the data from shift registers 20 and 22 to combine in summing register 36. If the comparison of the two sub-bands is more than threshold, the comparator's output signal is high and will turn on transistor 30. Thus, the output of this transistor will be pulled low (toward ground) which will turn off transistor 34, allowing only the data in shift register 22 to pass to summing register 36. The data contents of the summing register now represents the true signal for signal processing purposes. Generally, the total charge packet from this summing device would be sampled using a Distributed Floating Gate Amplifier (DFGA) with taps on the 4th and 8th stages. The appropriate tap to be used depends on the results of the threshold test. Four stages are used if both bands are retained and eight stages if only one band is chosen. The selection of the proper amplification is necessary to assure proper scaling of the analog signal before analog-to-digital conversion and further processing is performed.

It should also be noted that the operation of the comparator 24 involves determining the ratio of sub-band A to sub-band B. The need to perform actual division is obviated by adjusting the gains of the two distributed floating-gate amplifiers prior to thresholding in the comparator.

Thus, while preferred constructional features of the invention are embodied in the structure illustrated herein, it is to be understood that changes and variations may be made by the skilled in the art without departing from the spirit and scope of the invention. In particular, any amplifiers with adjustable gains are suitable for scaling of data from sub-bands A and B. In addition, the positions of the multiplexer and the amplifier may be interchanged without affecting the concept. In a monolithic focal plane array, this latter approach allows use of a single amplifier for each channel.

We claim:

1. An apparatus for spatial target detection comprising:
    a plurality of sensors, said plurality of sensors being divided into at least two groups; each group having a multiplexing means for combining signals from said sensors, and a separate memory means for storing data representing the signals from its multiplexer means;
    data selection means operative to select a combination of data from the separate memory means of the different groups if a ratio of the data from the multiplexing means of the different groups is less than a predetermined threshold, said data selection means being alternatively operative to select data from only one memory means if a ratio of the data from the multiplexing means is greater than the threshold.

2. The apparatus of claim 1, wherein said memory means for storing the signals from each multiplexer means includes analog CCD (Charge Coupled Device) shift registers.

3. The apparatus of claim 2, wherein said data selection means includes comparator means for comparing each group of data that has been processed through the multiplexer means with each other and with the threshold and generating a signal to an electronic switching means for performing data selection.

4. The apparatus of claim 3, wherein said data selection means also includes an additional memory for storing selected data.

* * * * *